(12) United States Patent
Onishi et al.

(10) Patent No.: US 8,668,850 B2
(45) Date of Patent: Mar. 11, 2014

(54) FLAME-RETARDED FOAMED PLASTIC COMPOSITIONS AND SHAPED ARTICLES

(75) Inventors: Hideaki Onishi, Otsu (JP); Ken Morishita, Kyoto (JP)

(73) Assignee: Dai-Ichi Kogyo Seiyaku Co., Ltd., Shimogyo-ku, Kyoto (JP)

( * ) Notice: Subject to any disclaimer, the term of this patent is extended or adjusted under 35 U.S.C. 154(b) by 1210 days.

(21) Appl. No.: 11/398,585

(22) Filed: Apr. 6, 2006

(65) Prior Publication Data

US 2006/0229372 A1 Oct. 12, 2006

(30) Foreign Application Priority Data

Apr. 12, 2005 (JP) .................. 2005-114100

(51) Int. Cl.
*C09K 21/08* (2006.01)
*C09K 21/10* (2006.01)
*C08L 25/06* (2006.01)

(52) U.S. Cl.
USPC .......................................... 252/609; 521/139

(58) Field of Classification Search
USPC .......................................... 521/139; 252/609
See application file for complete search history.

(56) References Cited

U.S. PATENT DOCUMENTS 4,221,700 A * 9/1980 Minagawa et al. ............ 524/128
2003/0191203 A1* 10/2003 Oohara et al. .................. 521/79

FOREIGN PATENT DOCUMENTS

JP 63172744 A * 7/1988

OTHER PUBLICATIONS

CAPLUS English abstract of Umeda et al. JP 63172744 A, 1988.*
Japanese Industrial Standard, JIS A 9511:2006R (JTIA/JSA) "Performed cellular plastics thermal insulation materials" Revised Aug. 20, 2009. Translated and Published by Japanese Standards Association.

* cited by examiner

*Primary Examiner* — Peter F Godenschwager
(74) *Attorney, Agent, or Firm* — Millen, White, Zelano & Branigan, P.C.

(57) ABSTRACT

A flame retarded foamed plastic composition comprises a polystyrene type resin; a brominated flame retardant having a Br content greater than 60% by weight and a 5 wt % loss temperature of 190-320° C.; a hindered amine of 4-hydroxy-2,2,6,6-tetramethylpiperidine carboxylate series, and a blowing agent.

23 Claims, No Drawings

FLAME-RETARDED FOAMED PLASTIC COMPOSITIONS AND SHAPED ARTICLES

TECHNICAL FIFLED

The present invention relates to a flame-retarded, foamed plastic composition and shaped articles produced therefrom. The foamed articles typically find use as insulating materials, packaging materials and other uses.

BACKGROUND ART

Foamed polystyrene articles have been used in a variety of application fields as above due to their high heat insulating property, high water resistance, light weight and adequate mechanical strength. There remains a need for further improving these properties, particularly flame retardancy in each application field. Polystyrene is flammable and generates a large amount of heat upon burning. In addition, polystyrene foams have a large surface area which leads to rapid burn-out once ignited. Thus, polystyrene foams need to be flame-retarded for safety against fire.

Recently environmental concern about fluorinated hydrocarbons generally referred to "FLON" due to the destruction of ozone layer and global warming accelerated replacement of FLONs with flammable hydrocarbons and alkyl ethers as blowing agent for polystyrene foams. This replacement adds some difficulties in the production of flame retarded polystyrene foams. Increased flammability of the foam may be compensated for by increasing the amount of a flame retardant to be added. However, increase in the amount of flame retardant not only adversely affects other requisite properties including mechanical strength and bulk density but increases the production cost.

Usually, polystyrene foams have been flame-retarded with a halogenated flame retardant. Most commonly, hexabromocyclododecane (HBCD) has been used in the extrusion foaming process while tetrabromocyclooctane (TBCO) and HBCD have been used in the bead foaming process.

HBCD and TBCO are relatively thermally unstable and their 5 wt % loss temperature are 230-250° C. and 200° C., respectively. When they are used alone in the extrusion foaming process, they cause various problems including discoloration of the foam. In addition, hydrogen bromide and other decomposition products may corrode parts of the extruding machine. Various attempts have been made in the prior art to use HBCD in combination with a heat stabilizer in the extrusion foaming process. These stabilizers include a combination of an organotin polymer and an isopropylidenediphenyl phosphite compounds (JP59/43060B), a combination of an organotin compound and an alkaline earth metal soap (JP 5/24174B), and hydrotalcite (JP 2004/161868A). Use of organotin compounds in combination with other heat stabilizers may be found in a number of patent literature. These heat stabilitzers present another problem or have been proven to be not satisfactory in performance. The organotin stabilizers are ecologically harmful. The isopropylidenediphenyl phosphite compound is susceptible to hydrolysis. This may prevent recycling of foam scraps. Higher fatty acid alkaline earth metal soaps and hydrotalcite have been proven, in our tests, to be effective to stabilize the brominated flame retardant but they decrease the flame retardancy remarkably.

As a flame retardant other than HBCD and TBCO, tetra-bromobisphenol A-bis(2,3-dibromo-2-methylpropyl)ether is known. This compound has a 5 wt % loss temperature of about 270° C. This flame retardant is not satisfactory in terms of thermal stability for use in polystyrene foams particularly in the presence of a foam nucleus agent such as talc, bentonite, kaolin, mica, silica or diatomaceous earth unless some heat stabilizers are combined. JP 51/25061B discloses combined use of the just mentioned flame retardant and a higher fatty acid metal soap. As noted above, the metal soap may remarkably compromise the flame retardancy of the foam although it is effective to stabilize the flame retardant. JP 5/67654B discloses addition of a flame retardant of the above type as a solution in a organic solvent to the polystyrene foam in the absence of any nucleus agent. This method has only limited use and must suffer from discoloring and decreased flame retardancy of the foam where the presence of a nucleus agent is essential to improve the cell texture of the foam.

Other examples of a flame retardant having a 5 wt % loss temperature between 280° C. and 320° C. include tetrabromobisphenol A-bis(2,3-dibromopropyl)ether, tris(2,3-dibromopropyl)isocyanurate and tris(tribromoneopentyl) phosphate. These flame retardants are not capable of imparting the polystyrene foam with the desired level of flame retardancy when used alone and require certain enhancers such as tetrabromobisphenol diallyl ether or tribromophenyl ally ether as disclosed in JP 2003/301064A. The allyl ether compounds tend to compromise the heat stability of the foam when added an amount sufficient to enhance the flame retardancy to the desired level. This deficiency cannot be remedied with the addition of various heat stabilizers.

It has been proposed to add a free radical generator such as 2,3-dimethyl-2,3-diphenylbutane in combination with a brominated flame retardant. See, for example, JP 44/9821B, JP 2003/292664A, JP 2004-278010A and JP 2005/8739A. In case of HBCD, the free radical generator is effective at a relatively small amount of addition to enhance the flame retardancy but deteriorative to preserve the initial properties of resin including molecular weight during the processing in order to recycle the foam scraps. For other flame retardants, larger amounts of the generator are required to enhance the flame retardancy which naturally results in the degradation of the initial properties of the resin.

As discussed above, polystyrene foams may be flame retarded with a brominated flame retardant having a 5 wt % loss temperature between 190° C. and 280° C. even at a small amount of addition but the flame retardant of this type may cause various problems due to its low heat stability. With a flame retardant having a 5 wt % loss temperature higher than 280° C., it is imperative to increase the amount of flame retardant to achieve the desired level of flame retardancy which, in turn, compromises other properties of the foam.

DISCLOSURE OF THE INVENTION

It is a principal object of the present invention to provide a flame retarded foamed polystyrene composition which can eliminate or ameliorate the above disadvantages. Another object of the present invention is to provide shaped polystyrene foam having the desired level of flame reatrdancy while retaining other desirable properties for use as heat insulating materials and other applications.

These and other objects and advantages of the present invention may be accomplished by providing a flame-retarded, foamed polystyrene type resin composition comprising:

(A) 100 parts by weight of a polystyrene type resin;
(B) 0.5-10 parts by weight of a brominated flame retardant having a bromine content of greater than 60% by weight and a 5% by weight loss temperature within a range between 190° C. and 320° C.;

(C) 0.001-0.3 parts by weight of a hindered amine compound of Formula 1:

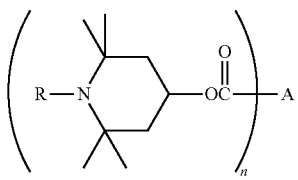

wherein R is H, $C_1$-$C_{13}$ alkyl or $C_1$-$C_{10}$ alkoxy, A is a hydrocarbon residue of an aliphatic or aromatic carboxylic acid having a functionality number of n, and n is 1, 2, 3 or 4;

(D) 0.01-0.5 moles per 10 g of (A) of a blowing agent;

(E) 0-20 parts by weight of a foam nucleus agent; and (F) 0-0.3 parts by weight of a phosphite ester heat stabilizer.

In another aspect, the present invention provides a shaped foam article produced from the resin composition of the present invention.

The present invention has its basis on our discovery that the flame retardancy of the polystyrene foam may be significantly enhanced by adding the above flame retardant (B) and the above hindered amine (C) in combination. This allows significant reduction of the amount of flame retardant (B) to be added compared to the addition of the flame retardant (B) alone in order to eliminate or ameliorate the adverse effect of the flame retardant (B) on the thermal and physical properties of the resin (A). When the resin composition is foamed by the extrusion foaming process, the flame retardant (B) which is otherwise unstable at or above the melting point of the resin (A) may be kept stable and the physical properties of the resin (A) may be preserved to a large extent as the original resin allowing to recycle the foam scraps. The same applies to the bead foaming process where the foamable beads are heated with steam at a temperature up to 120° C.

BEST MODE FOR CARRYING OUT THE INVENTION

Now preferred embodiments of the present invention will be described in detail. All parts and percents therein are by weight unless otherwise indicated.

(A) Polystyrene Type Resin

The term "polystyrene type resin" as used herein refers to polystyrene and copolymers thereof containing more than 50% of styrene and the balance of a monomer copolymerizable with styrene. Examples of the comonomers include o-, m- or p-methylstyrene(vinyltoluene), 2,4-dimethyl-styrene, ethylstyrene, p-t-butylstyrene, α-methylstyrene, α-methyl-p-vinyltoluene and 1,1-diphenylethylene. Polystyrene is typical.

Also included in the polystyrene type resins are homo- and copolymers containing less than 30%, typically less than 20% of an elastomer microdispersed therein. Examples of the elastomers include polybutadiene, polyisoprene, styrene-butadiene copolymer, styrene-isoprene copolymer, acrylonitrile-butadiene copolymer, styrene-isobutylene-butadiene copolymer, butadiene-(meth)acrylate copolymer, styrene-butadiene block copolymer, styrene-isoprene block copolymer, isobutylene-isoprene copolymer (butyl rubber), ethylene-propylene copolymer (EP rubber), silicone rubber, and hydrogenated styrene-butadiene block copolymer.

(B) Brominate Flame Retardant

The present invention utilizes as a flame retardant an organic bromine compound having a bromine content of greater than 60% and a 5 wt % loss temperature between 190° C. and 320° C.

A preferred class of the brominated flame retardants have at least two bromine atoms attached to two adjacent aliphatic carbon atoms. The brominated flame retardants of this class are produced by the addition reaction of bromine to a precursor compound having at least one olefinic unsaturation such as alicyclic olefins, allyl or methally compounds. It is preferable to carry out the addition reaction as completely as possible to remove unreacted precursor compound from the reaction product as much as possible.

Another class of the brominated flame retardants have, although less preferred, at least one monobrominated alkyl group. The brominated flame retardants of the second class may be produced by reacting hydrogen bromide with a precursor compound having at least one alkanol group.

Specific examples of the brominated flame retardants falling in the above classes include hexabromocyclododecane (HBCD); tetrabromocyclooctane (TBCO); tetrabromobisphenol A, S or F bis(2,3-dibromopropylether); tetrabromobisphenol A, S or F bis(2,3-dibromo-2-methylpropylether); tetrabromobisphenol A, S or F bis(2-bromoethylether); tris(2,3-dibromopropyl)cyanurate or isocyanurate; tris(2,3-dibromo-2-methylpropyl)cyanurate or isocyanurate; bis(tribromoneopentyl)maleate, bis(tribromoneopentyl)fumarate, bis(tribromoneopentyl)phthalate, bis(tribromoneopentyl)terephthalate, tris(tribromoneopenyl)trimellitate, bis(2,3-dibromopropyl)phthalate, bis(2,3-dibromopropyl)terephthalate, tris(2,3-dibromopropyl)trimellitate, and tris(tribromoneopentyl)phosphate.

Tetrabromocyclooctane (TBCO), hexabromocyclododecane (HBCD), tertrabromobisphenol A, S or F bis(2,3-dibromopropylether), tetrabromobisphenol A, S or F bis(2,3-dibromo-2-methylpropylether), tris(2,3-dibromopropyl) cyanurate or isocyanurate and tris(tribromoneopentyl) phosphate are preferable.

The amount of the brominated flame retardant may vary depending on certain factors such as the nature of particular flame retardants and the particular foaming or blowing process, and generally lies between 0.5-10 parts, preferably up to 5 parts per 100 parts of the resin (A).

(C) Hindered Amine Compound

Hindered amine compounds are known as light stabilizers for polymeric materials which protect the materials from degradation induced by long-term exposure to light, typically sunlight. However, it is not known, to our best knowledge, to incorporate them in combination with a brominated flame retardant into polystyrene foam for the purpose of enhancing the flame retardancy and heat stability of the foam.

The hindered amine compounds which are found effective in the present invention have the formula 1:

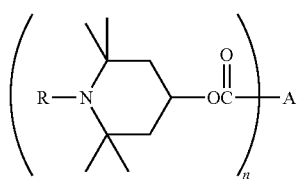

wherein R is H, a $C_1$-$C_{13}$ alkyl or a $C_1$-$C_{10}$ alkoxy, A is a hydrocarbon residue of an aliphatic or aromatic carboxylic acid having a functionality number of n, and n is 1, 2, 3 or 4.

The hindered amine compounds of the formula 1 are carboxylates of 4-hydroxy-2,2,6,6-tetramethylpiperidine, 4-hydroxy 1-alkyl-2,2,6,6-teramethylpiperidine, typically 4-hydroxy-1,2,2,6,6-pentamethylpiperidine, or 4-hydroxy-1-alkoxy-2,2,6,6-tetramethylpiperidine, typically 4-octyloxy-2,2,6,6-tetramethylpiperidine. The carboxylic acid for esterifying the above hydroxypiperidines may be represented as A-(COOH)n and examples thereof include monocarboxylic acids such as acetic, propionic, butyric or benzoic acid; dicarboxylic acids such as malonic, succinic, sebacic (decanedioic), phthalic, isophthalic or terephthalic acid; tricarboxylic acid such as trimellitic acid; and tetracarboxylic acid such as butane-1,2,3,4-tetracarboxylic acid. 2-Mono- or disubstituted malonic acid such as 2-(3,5-di-t-butyl-4-hydroxybenzyl)-2-n-butylmalonic acid is also included in the dicarboxylic acid.

Specific examples of hindered amine compounds include but not limited to 4-benzoyloxy-2,2,6,6-tetramethyl-piperidine, bis(2,2,6,6-tetramethyl-4-piperidinyl) sebacate, bis(1,2,2,6,6-pentamethyl-4-piperidinyl) sebacate, bis[2,2,6,6-teramethyl-4-piperidinyl]-2-[(3,5-di-t-butyl-4-hydoxybenzyl)-2-n-butyl]malonate, tetrakis(2,2,6,6-tetramethyl-4-piperidinyl)butane-1,2,3,4-tetracarboxylate, tetrakis(1,2,2,6,6-pentamethyl-4-piperidinyl)butane-1,2,3,4-tetracarboxylate, and bis(1-octyloxy-2,2,6,6-tetramethyl-4-piperidinyl) butane-1,2,3,4-carboxylate. In case of polycarboxylate esters, mixed esters having different 4-piperinyloxy groups and mixed esters having one or more 4-piperidinyloxy groups and a group other than the 4-piperidinyloxy groups are included in the hinder amine compound. Typical examples of commercially products are bis(2,2,6,6-tetramethyl-4-piperidinyl)sebacate (SANOL LS-770, Sankyo), bis(1,2,2,6,6-pentamethyl-4-piperidinyl) sebacate (SANOL LS-765, Sankyo), and bis(1-octyloxy-2,2,6,6-tetramethyl-4-piperidinyl) sebacate (TINUVIN 123, Ciba Specialty Chemicals).

The hindered amine compound (C) is effective even in a very small amount of addition ranging between 0.001 and 0.3 parts, preferably less than 0.1 parts, and typically 0.005-0.05 parts per 100 parts of the resin (A). The addition of hindered amine compound (C) in conjunction with the brominated flame retardant (B) significantly enhances the flame retardancy of the foam and also protects the resin (A) from the attack by the brominated flame retardant (B) under heat while retaining the flame retardancy thereof.

(D) Blowing Agent

Any of known blowing agents may be employed. Examples thereof include a volatile hydrocarbon or halogenated hydrocarbon which vaporizes at the foaming temperature such as propane, butane, isobutane, pentane, hexane, 1-chloro-1,1-difluroethane, monochlorodifluoromethane, monochloro-1,2,2,2-tetrafluoroethane, 1,1-difluoroethane, 1,1,1,2-tetrafluoroethane, 1,1,3,3,3-pentafluoropropane or dichloromethane, 1,2-dichloroethane; ethers such as dimethyl ether, diethyl ether or ethyl methyl ether; inorganic blowing agents such as water or nitrogen; and chemical blowing agents such as azo compounds. A $C_3-C_6$ alkane is preferable for environmental reasons.

The amount of blowing agent (D) may vary depending on the nature of particular blowing agents employed and the blowing process whether extrusion blowing or bead-blowing, and generally ranges between 0.01 and 0.5 moles, preferably 0.05 and 0.3 moles per 100 parts of the resin (A).

(E) Nucleus Agent

Inorganic materials such as talc, bentonite, kaolin, mica, silica, clay or diatomaceous earth are often added to the polystyrene foam as nucleus agent or cell adjusting agent. These nucleus agents may optionally be added to the composition of the present inveniton. Talc is preferable. The nucleus agent is added, when used, in an amount of up to 20 parts by weight, suitably up to 10% by weight and most preferably 0.5-2.0 parts by weight per 100 parts by weight of the resin (A). Excessive addition may adversely affect the quality of the foam.

(F) Phosphite Heat Stabilizer

Phosphite esters are known to have a synergistic effect when combined with a hindered phenol antioxidant and are added in combination with the hindered phenol antioxidant to plastics to protect against oxidative degradation.

A variety of phosphite esters are known and commercially available for the above-stated purposes. Examples thereof include tris(2,4-di-t-butylphenyl)phosphite, bis(2,4-di-t-butylphenyl)pentaerythritol diphosphite, bis[2,4-bis(1,1-dimethylethyl)-6-methylphenyl]ethyl phosphite, tetrakis(2,4-di-t-butylphenyl)-(1,1-biphenyl)-4,4'-diyl bisphosphonite, bis(nonylphenyl)pentaerythritol diphosphite, bis(stearylpentaerythritol)diphosphite, bis(2,6-di-t-butyl-4-methylphenyl)pentaerythritol diphosphite, 2,2'-methylenebis(4,6-di-t-butyl-1-phenyloxy) (2-ethyloxy)phosphorus, tetra(tridecyl)-4,4'-butylidene bis(2-t-butyl-5-methylphenyl)diphosphite, hexa(tridecyl)-1,1,3-tris(3-t-butyl-6-methyl-4-oxyphenyl)-3-methylpropane triphosphite, di(nonylphenyl)-p-nonylphenyl phosphite, tris(nonylphenyl) phosphite, tetra-$C_{12}$-$C_{16}$ alkyl-4,4'-isopropylidene-(bisphenyl)diphosphite, mono- or diphenyl-mono- or di-$C_8$-$C_{13}$ alkyl phosphite, mono- or diphenyl-mono- or di-($C_8$-$C_{13}$)alkoxyalkyl phosphite, diphenyl isodecyl phosphite, tris(decyl) phosphite, and triphenyl phosphite, Phosphite esters having a phenoxy group substituted with two more alkyl groups such as tris(2,4-di-t-butylphenyl)phosphite and bis(2,6-di-t-butyl-4-methylphenyl) pentaerythritol diphosphite are preferable for their less susceptibility to hydrolysis. The phosphite ester is added, when used, in an amount of up to 0.3, preferably up to 0.1 parts by weight per 100 parts by weight of the resin.

(G) Other Optional Additives

Besides optional additives (E) and (F), the composition of the present invention may contain a minor amount, usually less than 1 part by weight per 100 parts by weight of the resin (A) of a hindered phenol antioxidant, a free radical generate or an aromatic phosphate ester, all well known in the plastic industry. The hindered phenol antioxidant is known to act as a primary antioxidant for thermoplastic materials mainly consisting of carbon and hydrogen atoms. Typical examples thereof include pentaerythritol-tetrakis[3-(3,5-di-t-butyl-4-hydroxyphenyl)propionate] and other hindered phenol antioxidants available from Ciba Specialty Chemicals known as IRGANOX series. Typical examples of free radical generators include 2,3-dimethyl-2,3-diphenylbutane and its homologs or peroxide free radical generators such as dicumyl peroxide. Aromatic phosphate esters are known as a plastitizer or an auxiliary flame retardant. Triphenyl phosphate, tricresylphosphate and trixylylphosphate are typical. All of the hindered phenol antioxidant, the free radical initior and the aromatic phosphate ester may promote the thermal stability of the brominated flame retardants during processing thereby protecting the flame retarded composition from degradation.

The foamed composition of the present invention may, of course, comprise a variety of conventional additives. Examples of conventional additives include inorganic auxiliary flame retardants such as antimony trioxide, zinc boroate, ferric oxide, and hydrated aluminum or magnesium oxide;

UV absorbers, fillers; lubricants, drip retardants, crystal nucleus agent, anti-static agents; and pigments.

The composition of the present invention may be processed into foamed articles either by the extrusion foaming process or by the bead foaming process. In the former foaming process, a blend of the resin (A) and various additives other than the blowing agent (D) is fed to an extruder machine and heated in the machine to melt the resin. Then, the blowing agent (D) is introduced under pressure into the machine at a location where additives have been uniformly mixed with the molten resin and the mixture is extruded through a die into a mold or open atmosphere to allow expansion. In the latter foaming process, various additives other than the blowing agent are incorporated into the resin particles or beads, and then the blowing agent is imbibed in the resin beads by impregnation under pressure. The resin particles or beads containing the additives may be prepared by dissolving or dispersing the additives in the monomer component of the resin and suspension-polymerizing the monomer. Alternatively, the additives may be incorporated in the resin particles or beads as suspension-polymerized by impregnation or mechanical mixing. Finally, the blowing agent-imbibed resin beads are placed in a mold and heated typically with steam to allow expansion.

EXAMPLES

The following examples and comparative examples are given to illustrate the present invention without limiting thereto. All parts and percents therein are by weight unless otherwise indicated.

1. Materials (A) Polystyrene Type Resin:

PSJ Polystyrene G9401, PS Japan Co., Ltd.

(B) Brominated Flame Retardant

B#1: Hexabromocyclododecane; PYROGUARD SR-103, Dai-Ichi FR Co., Ltd., Br Content 75%, 5 wt % loss temp. 240° C.

B#2: Tetrabromobisphenol A-bis(2,3-dibromo-2-methylpropyl ether), Br content 66%, 5 wt % loss temp. 265° C.

B#3: Tetrabromobisphenol A-bis(2,3-dibromo-propyl ether), PYROGUARD SR-720, Dai-Ichi FR Co., Ltd., Br content 68%, 5 wt % loss temp. 295° C.

B#4: Tris(2,3-dibromopropyl)isocyanurate, TAIC-6B, Nippon Kasei Chemicals Co., Ltd. Br content 63%, 5 wt % loss temp. 290° C.

(C) Hindered Amine Compound

C#1: Bis(2,2,6,6-tetramethyl-4-piperidinyl) sebacate, SANOL LS-770, Sankyo Organic Chemical Co., Ltd.

C#2: Bis(-1,2,2,6,6-pentamethyl-4-pipridinyl)sebacate, SANOL, LS-765, Sankyo Organic Chemical Co., Ltd.

C#3: Bis(2,2,6,6-tetramethyl-1-octyloxy-4-piperidinyl) sebacate, TINUVIN 123, Ciba Specialty Chemicals Ltd.

(D) Blowing Agent

D#1: Pentane

D#2: Butane (E) Foam Nucleus Agent

Talc MS, Nippon Talc Kogyo Co., Ltd.

(F) Phosphite Ester

F#1: Tris(2,4-di-t-butylphenyl) phosphite, IRGAPHOS 168, Ciba Specialty Chemicals Ltd.

F#2: Bis(2,6-di-t-butyl-4-methylphenyl)pentaerythritol diphosphite, ADEKA STAB PEP-36, Asahi Denka Co., Ltd.

(G) Hindered Phenol Antioxidant

Pentaerythritol-tetrakis[3-(3,5-di-t-butyl-4-hydroxyphenyl)propionate], IRGANOX 1010, Ciba Specialty Chemicals Ltd.

(H) Free Radical Generator

H#1: 2,3-dimethyl-2,3-diphenylbutane

H#2: Dicumyl peroxide (I) Organotin Heat Stabilizer (for Comparison)

Dibutyltin maleate polymer, STAN BM(N) Sankyo Organic Chemical Co., Ltd.

2. Foaming Process (1) Extrusion Foaming Process (Examples 1-9 and Comparative Examples 1-7)

A two-step extruder system comprising series-connected first extruder having inner diameter (ID) of 65 mm and second extruder having ID of 90 mm was used. All materials other than the blowing agent were fed to the first extruder and heated to 200° C. to melt and mix the materials thoroughly. The blowing agent was introduced under pressure through a separate line at a location near the forward end of the first extruder. Then the molten materials were continuously transferred to the second extruder, cooled there to a temperature of 120° C., and extruded to the atmosphere through a die having a rectangular shape of 2.5 mm×45 mm size into a foamed extrudate having a rectangular cross-section.

(2) Bead Foaming Process (Examples 10-13 and Comparative Examples 8-9)

A 5 liter autoclave equipped with stirrer was charged with 2,000 g of deionized water, 4 g of calcium phosphate and 0.5 g of sodium laurylbenzene sulfonate. Separately, to 2,000 g of styrene monomer were added 6 g of benzoyl peroxide (BPO) as polymerization initiator, 10 g of dicumyl peroxide and other additives other than the blowing agent. The resulting mixture was then added to the autoclave and stirred at 100° C. for 8 hours to polymerize the monomer. After the completion of polymerization, 200 g of the blowing agent was introduced to the autoclave and kept the inner temperature at 115° C. for 8 hours to impregnate the polymer particles in situ with the blowing agent before separating water from the reaction mixture. The resulting polystyrene beads impregnated with the blowing agent were first heated at 100° C. with steam for pre-foaming and the pre-foamed beads was placed in a mold and heated again to 115° C. with pressurized steam to produce a shaped foam.

(3) Bead Foaming Process (Examples 14-18 and Comparative Examples 10-11)

The procedures of the above bead foaming process were followed up to the suspension polymerization step except that only benzoyl peroxide was dissolved in the styrene monomer. The resulting polystyrene beads were separated by filtration, washed with distilled water, dried, and classified into beads of 0.3-1 mm diameter size. The weight average molecular weight (Mw) measured by the gel permeation chromatograph (GPC) was about $4.5 \times 10^5$. An autoclave equipped with stirrer was charged with 100 g of distilled water, 0.3 g of sodium laurylbenzenesulfonate, 2 g of calcium silicate, 1 g of trixylyl phosphate (TXP) and various additives other than the blowing agent and the mixture was homogeneously emulsified with stirring at room temperature. 10 g of the classified polystyrene beads was added to the emulsion and heated at 100° C. for 5 hours with stirring to impregnate with various additives other than the blowing agent. After the first impregnation, 10 g of the blowing agent was introduced to the autoclave under pressure and the mixture was heated to 115° C. for 8 hours with stirring to impregnate with the blowing agent. After separation of water, the impregnated beads were processed to a shaped foam following the procedure as described above.

4. Evaluation Method

Quality:

Appearance of foam is visually evaluated according to the following schedule.

Good: Essentially free of cracks, voids and coarse cells with stable extrusion

Not good: Cracks, voids and coarse cells occurred with unstable extrusion such as gas blow from the extrusion die.

Flame Retardancy:

Evaluation is made according to JIS A-9511 whether the foam passes or does not pass this standard.

Oxygen Index (LOI):

A cut specimen of the foam is tested for oxygen index according to the method of JIS K-7201.

Self Extinguishing Property (SE):

Yes: LOI≥26.0

No: LOI<26.0

Decrease in Molecular Weight:

The weight average molecular weight (Mw) of the polystyrene is measured before and after the processing into the foam by the GPC method. Percents decrease in Mw is calculated from the difference before and after the processing.

Formulations and evaluation results are shown in Tables below.

TABLE 1

| | EXAMPLE | | | | |
|---|---|---|---|---|---|
| Material(parts) | 1 | 2 | 3 | 4 | 5 |
| Polystyrene A | 100 | 100 | 100 | 100 | 100 |
| Flame retardant | | | | | |
| B#1 | 2.0 | 2.0 | 1.5 | | |
| B#2 | | | | 2.0 | 2.0 |
| B#3 | | | | | |
| B#4 | | | | | |
| Hindered amine | | | | | |
| C#1 | 0.02 | 0.02 | | | |
| C#2 | | | 0.02 | 0.05 | 0.02 |
| C#3 | | | | | |
| Blowing agent | | | | | |
| D#1 | 8.0 | 8.0 | 8.0 | 8.0 | 8.0 |
| Talc E | 1.0 | 1.0 | 1.0 | 1.0 | 1.0 |
| Phosphite | | | | | |
| F#1 | | 0.01 | | | |
| F#2 | | | 0.03 | | 0.03 |
| Hindered phenol G | | | | | |
| Radical generator | | | | | |
| H#1 | | | | 0.02 | |
| Evaluation | | | | | |
| Appearance | Good | Good | Good | Good | Good |
| F. retardancy | Pass | Pass | Pass | Pass | Pass |
| LOI | 26.4 | 26.9 | 26.7 | 27.1 | 27.9 |
| SE | Yes | Yes | Yes | Yes | Yes |
| Δ Mw(%) | <3 | <3 | <3 | <3 | <3 |

TABLE 1-continued

| | EXAMPLE | | | |
|---|---|---|---|---|
| Material(parts) | 6 | 7 | 8 | 9 |
| Polystyrene A | 100 | 100 | 100 | 100 |
| Flame retardant | | | | |
| B#1 | | | | |
| B#2 | 2.0 | 1.0 | | |
| B#3 | | | 2.5 | |
| B#4 | | | | 2.5 |
| Hindered amine | | | | |
| C#1 | | | 0.1 | 0.1 |
| C#2 | | | | |
| C#3 | 0.02 | 0.01 | | |
| Blowing agent | | | | |
| D#1 | 8.0 | 8.0 | 8.0 | 8.0 |
| Talc E | 1.0 | 1.0 | 1.0 | 1.0 |
| Phosphite | | | | |
| F#1 | | | 0.05 | |
| F#2 | 0.06 | 0.1 | | 0.05 |
| Hindered phenol G | 0.01 | | | |
| Radical generator | | | | |
| H#1 | | 0.02 | 0.02 | 0.02 |
| Evaluation | | | | |
| Appearance | Good | Good | Good | Good |
| F. retardancy | Pass | Pass | Pass | Pass |
| LOI | 27.5 | 26.6 | 26.2 | 26.3 |
| SE | Yes | Yes | Yes | Yes |
| Δ Mw(%) | <3 | <3 | <3 | <3 |

TABLE 2

| | COMPARATIVE EXAMPLE | | | | | | |
|---|---|---|---|---|---|---|---|
| Material(parts) | 1 | 2 | 3 | 4 | 5 | 6 | 7 |
| Polystyrene A | 100 | 100 | 100 | 100 | 100 | 100 | 100 |
| Flame retardant | | | | | | | |
| B#1 | 2.0 | 3.0 | 2.0 | | | | |
| B#2 | | | | 3.0 | 3.0 | | |
| B#3 | | | | | | 5.0 | |
| B#4 | | | | | | | 5.0 |
| Organotin stabilizer I | | 0.02 | | | 0.02 | | |
| Blowing agent | | | | | | | |
| D#1 | 8.0 | 8.0 | 8.0 | 8.0 | 8.0 | 8.0 | 8.0 |
| Talc E | | | | | | | |
| Phosphite | | | | | | | |
| F#1 | | 0.01 | | | | | |
| F#2 | | | 0.03 | | 0.03 | 0.05 | 0.1 |
| Hindered phenol G | | | | | | 0.01 | |

TABLE 2-continued

| | COMPARATIVE EXAMPLE | | | | | | |
|---|---|---|---|---|---|---|---|
| Material(parts) | 1 | 2 | 3 | 4 | 5 | 6 | 7 |
| Radical generator | | | | | | | |
| H#1 | | | 0.02 | | | 0.02 | 0.02 |
| Evaluation | | | | | | | |
| Appearance | Good | Good | Good | Not Good | Not Good | Not Good | Not Good |
| F. retardancy | Not pass | Pass | Pass | Not pass | Pass | Not pass | Not pass |
| LOI | 24.8 | 26.1 | 25.4 | 25.6 | 26.4 | 24.0 | 24.2 |
| SE | No | Yes | No | No | Yes | No | No |
| Δ Mw | 15 | 20 | 30 | 50 | 30 | 10 | 10 |

TABLE 3

| | EXAMPLE | | | | COMPARATIVE | |
|---|---|---|---|---|---|---|
| Material(parts) | 10 | 11 | 12 | 13 | 8 | 9 |
| Styrene monomer | 100 | 100 | 100 | 100 | 100 | 100 |
| Flame retardant | | | | | | |
| B#1 | 1.0 | 1.0 | | | 1.0 | |
| B#2 | | | 1.0 | 1.0 | | 1.0 |
| Hindered amine | | | | | | |
| C#2 | 0.01 | | 0.005 | | | |
| C#3 | | 0.01 | | 0.01 | | 0.01 |
| Blowing agent | | | | | | |
| D#2 Phosphite | 10.0 | 10.0 | 10.0 | 10.0 | 10.0 | 10.0 |
| F#1 | | | 0.01 | | | 0.01 |
| F#2 | 0.01 | | | | 0.01 | |
| Initiator | | | | | | |
| BPO | 0.3 | 0.3 | 0.3 | 0.3 | 0.3 | 0.3 |
| Radical generator | | | | | | |
| H#2 | 0.5 | 0.5 | 0.5 | 0.5 | 0.5 | 0.5 |
| Evaluation | | | | | | |
| Appearance | Good | Good | Good | Good | Good | Good |
| F. retardancy | Pass | Pass | Pass | Pass | Not pass | Not pass |
| LOI | 27.5 | 26.9 | 27.8 | 27.5 | 24.8 | 25.4 |
| SE | Yes | Yes | Yes | Yes | No | No |

TABLE 4

| | EXAMPLE | | | | COMPARATIVE | |
|---|---|---|---|---|---|---|
| Material(parts) | 14 | 15 | 16 | 17 | 10 | 11 |
| PS beads | 100 | 100 | 100 | 100 | 100 | 100 |
| Flame retardant | | | | | | |
| B#2 | 1.0 | | | | 1.0 | |
| B#5 | | 1.0 | 1.0 | 1.0 | | 1.0 |
| Hindered amine | | | | | | |
| C#1 | 0.01 | | | | | |
| C#1 | | | 0.005 | | | |
| C#3 | | 0.01 | | 0.01 | | |
| Blowing agent | | | | | | |
| D#2 Phosphite | 10.0 | 10.0 | 10.0 | 10.0 | 10.0 | 10.0 |
| F#1 | | | 0.01 | | | 0.01 |
| F#2 | 0.01 | | | | 0.01 | |
| Radical generator | | | | | | |
| H#2 Phosphate ester | 0.5 | 0.5 | 0.5 | 0.5 | 0.5 | 0.5 |
| TXP | 1.0 | 1.0 | 1.0 | 1.0 | 1.0 | 1.0 |
| Evaluation | | | | | | |
| Appearance | Good | Good | Good | Good | Good | Good |
| F. retardancy | Pass | Pass | Pass | Pass | Not pass | Not pass |
| LOI | 26.9 | 26.6 | 27.4 | 27.3 | 24.3 | 24.9 |
| SE | Yes | Yes | Yes | Yes | No | No |
| Δ Mw(%) | <3 | <3 | <3 | <3 | 10 | 10 |

As examples 1-9 demonstrate, the shaped foams produced by the extrusion process showed the desired quality and flame retardancy and essentially retained molecular weight of the starting polystyrene. In contrast, the desired flame retardancy was not achieved in the absence of the hindered amine at the same level of the flame retardant as demonstrated by Comparative Example 1 and only achieved by increasing the level of the flame retardant with measurable degradation of polystyrene even in the presence of the phosphite and organotin heat stabilizers as demonstrated by Comparative Example 2. Comparative Example 3 shows that the degradation of the polymer is not compensated for by the addition of a free radical generator in place of the hindered amine. Comparative Examples 4-5 show that the presence of foam nucleus agent talc enhances degradation of the polymer remarkably in the extrusion foaming process.

With the flame retardants B#3 and B#4 having relatively higher 5 wt % loss temperature, the desired flame retardancy level and quality in the foam were achieved with lesser level of the flame retardant as demonstrated by Examples 8-9, while increase in the level of the flame retardant failed to achieve the desired flame retardancy and quality of the foam although the polymer was less degradated as demonstrated by Comparative Examples 6-7.

In the bead foaming process in which the flame retardant is added to the monomer, the desired flame retardancy was achieved without interfering with the polymerization as demonstrated by Examples 10-13 but failed to achieve the desired flame retardancy level with the same amount of addition of the flame retardant alone as demonstrated by Comparative Examples 8 and 9.

In the bead foaming process in which the flame retardant is incorporated into preformed polymer beads, the desired flame retardancy was achieved without decreasing the molecular weight of the polystyrene resin as demonstrated by Examples 14-17 but fail to achieve the desired flame retardancy level with the same amount of addition of the flame retardant with decrease in the molecular weight as demonstrated in Comparative Examples 10 and 11.

The invention claimed is:

1. A flame retarded foamed plastic composition comprising:
    (A) 100 parts by weight of a polystyrene type resin;
    (B) 0.5-5.0 parts by weight of a brominated flame retardant having a Br content greater than 60% by weight and a 5 wt % loss temperature of 190-320° C., said brominated flame retardant possessing at least two bromine atoms attached to two adjacent aliphatic carbon atoms;
    (C) 0.001-0.3 parts by weight of a hindered amine of Formula 1:

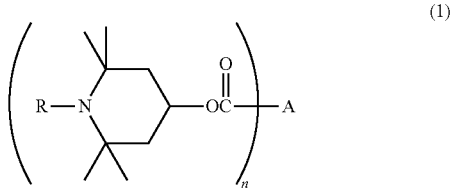

wherein
R is H, $C_1$-$C_{13}$ alkyl, or $C_1$-$C_{10}$ alkoxy,
n is 1, 2, 3 or 4,
A is the hydrocarbon residue of a aliphatic or aromatic carboxylic acid having a valency of n;
    (D) 0.01-0.5 mole per 100 g of said resin of a blowing agent;
    (E) 0-20 parts by weight of foam nucleus agent; and
    (F) 0-0.3 parts by weight a phosphite ester heat stabilizer,
    wherein said flame retarded foamed plastic composition exhibits a passing flame retardancy in accordance with JIS A9511, and an oxygen index, LOI, of >26.0, and a decrease in weight average molecular weight (Mw) of <3% of the polystyrene type resin resulting from processing the polystyrene type resin into a foam.

2. The flame retarded foamed plastic composition of claim 1, wherein said brominated flame retardant is selected from tetrabromocyclooctane, hexabromocyclododecane, tetrabromobisphenol A, S or F bis(2,3-dibromopropyl ether), tetrabromobisphenol A, S or F bis(2,3-dibromo-2-methylpropyl ether), tris(2,3-dibromopropyl) isocyanurate, tris(2,3-dibromopropyl) cyanurate, tris(tribromo-neopentyl) phosphate, and mixtures thereof.

3. The flame retarded foamed plastic composition of claim 1, wherein said hindered amine is an aliphatic or aromatic carboxylate of 4-hydroxy-2,2,6,6-tetramethylpiperidine, 4-hydroxy-1,2,2,6,6-pentamethylpiperidine or 4-hydroxy-1-octyloxy-2,2,6,6-tetramethylpiperide.

4. The flame retarded foamed plastic composition of claim 3, wherein said aliphatic or aromatic carboxylate is benzoate, malonate, 2-(3,5-di-t-butyl-4-hydroxybenzyl)-2-n-butylmalonate, sebacate, or butane-1,2,3,4-tetracarboxylate.

5. The flame retarded foamed plastic composition of claim 3, wherein the carboxylic acid used to form the aliphatic or aromatic carboxylate is acetic acid, propionic acid, butyric acid, benzoic acid, malonic acid, succinic acid, sebacic acid, phthalic acid, isophthalic acid, terephthalic acid, trimellitic acid, butane-1,2,3,4-tetracarboxylic acid, or 2-(3,5-di-t-butyl-4-hydroxybenzyl)-2-n-butylmalonic acid.

6. The flame retarded foamed plastic composition of claim 1, wherein said blowing agent is propane, butane, isobutane, pentane or hexane.

7. The flame retarded foamed plastic composition of claim 1, wherein said foam nucleus agent is talc.

8. The flame retarded foamed plastic composition of claim 1, wherein said phosphite heat stabilizer is tris(2,6-di-t-butylphenyl) phosphite or bis(2,6-di-t-butyl-4-methylphenyl) pentaerythritol diphosphite.

9. A shaped plastic foam article fabricated from the composition of claim 1.

10. The shaped plastic foam article of claim 9 fabricated by an extrusion foaming process.

11. The shaped plastic foam article of claim 9 fabricated by a bead foaming process.

12. The flame retarded foamed plastic composition of claim 1, wherein said brominated flame retardant is tetrabromobisphenol A, S or F bis(2,3-dibromo-2-methylpropyl ether).

13. The flame retarded foamed plastic composition of claim 1, wherein said polystyrene type resin is polystyrene and or a polystyrene copolymer of containing more than 50% of styrene and the balance being monomers which are copolymerizable with styrene and selected from o-, m- or p-methylstyrene(vinyltoluene), 2,4-dimethyl-styrene, ethylstyrene, p-t-butylstyrene, α-methylstyrene, α-methyl-p-vinyltoluene and 1,1-diphenylethylene.

14. The flame retarded foamed plastic composition of claim 13, wherein said polystyrene type resin contains less than 30% of an elastomer microdispersed therein, wherein said elastomer is polybutadiene, polyisoprene, styrene-butadiene copolymer, styrene-isoprene copolymer, acrylonitrile-butadiene copolymer, styrene-isobutylene-butadiene copolymer, butadiene-(meth)acrylate copolymer, styrene-butadiene block copolymer, styrene-isoprene block copolymer, isobutylene-isoprene copolymer (butyl rubber), ethylene-propylene copolymer (EP rubber), silicone rubber, or hydrogenated styrene-butadiene block copolymer.

15. The flame retarded foamed plastic composition of claim 1, wherein said brominated flame retardants is:
    hexabromocyclododecane;
    tetrabromocyclooctane;
    tetrabromobisphenol A, S or F bis(2,3-dibromopropylether);
    tetrabromobisphenol A, S or F bis(2,3-dibromo-2-methylpropylether);
    tetrabromobisphenol A, S or F bis(2-bromoethylether);
    tris(2,3-dibromopropyl)cyanurate or isocyanurate;
    tris(2,3-dibromo-2-methylpropyl)cyanurate or isocyanurate;
    bis(tribromoneopentyl)maleate;
    bis(tribromoneopentyl)fumarate;
    bis(tribromoneopentyl)phthalate;
    bis(tribromoneopentyl)terephthalate;
    tris(tribromoneopenyl)trimellitate;
    bis(2,3-dibromopropyl)phthalate;
    bis(2,3-dibromopropyl)terephthalate;
    tris(2,3-dibromopropyl)trimellitate; or
    tris(tribromoneopentyl)phosphate.

16. The flame retarded foamed plastic composition of claim 1, wherein said hindered amine is 4-benzoyloxy-2,2,6,6-tetramethyl-piperidine, bis(2,2,6,6-tetramethyl-4-piperidinyl) sebacate, bis(1,2,2,6,6-pentamethyl-4-piperidinyl) sebacate, bis[2,2,6,6-teramethyl-4-piperidinyl]-2-[(3,5-di-t-butyl-4-hydroxybenzyl)-2-n-butyl]malonate, tetrakis(2,2,6,6-tetramethyl-4-piperidinyl)butane-1,2,3,4-tetracarboxylate, tetrakis(1,2,2,6,6-pentamethyl-4-piperidinyl)butane-1,2,3,4-tetracarboxylate, or bis(1-octyloxy-2,2,6,6-tetramethyl-4-piperidinyl)butane-1,2,3,4-carboxylate.

17. The flame retarded foamed plastic composition of claim 1, wherein said blowing agent is propane, butane, isobutane, pentane, hexane, 1-chloro-1,1-difluoroethane, monochlorodifluoromethane, monochloro-1,2,2,2-tetrafluoroethane, 1,1-difluoroethane, 1,1,1,2-tetrafluoroethane, 1,1,3,3,3-pentafluoropropane, dichloromethane, 1,2-dichloroethane, dimethyl ether, diethyl ether, ethyl methyl ether, water, nitrogen, or an azo compound.

18. The flame retarded foamed plastic composition of claim 1, wherein the foam nucleus agent is talc, bentonite, kaolin, mica, silica, clay or diatomaceous earth.

19. The flame retarded foamed plastic composition of claim 1, wherein the phosphite ester heat stabilizer is tris(2,4-di-t-butylphenyl)phosphite, bis(2,4-di-t-butylphenyl)pentaerythritol diphosphite, bis[2,4-bis(1,1-dimethylethyl)-6-methylphenyl]ethyl phosphite, tetrakis(2,4-di-t-butylphenyl)-(1,1-biphenyl)-4,4'-diyl bisphosphonite, bis(nonylphenyl)pentaerythritol diphosphite, bis(stearylpentaerythritol)diphosphite, bis(2,6-di-t-butyl-4-methylphenyl)pentaerythritol diphosphite, 2,2'-methylenebis(4,6-di-t-butyl-1-phenyloxy) (2-ethyloxy) phosphorus, tetra(tridecyl)-4,4'-butylidene bis(2-t-butyl-5-methylphenyl)diphosphite, hexa(tridecyl)-1,1,3-tris(3-t-butyl-6-methyl-4-oxyphenyl)-3-methylpropane triphosphite, di(nonylphenyl)-p-nonylphenyl phosphite, tris(nonylphenyl) phosphite, tetra-$C_{12}$-$C_{16}$ alkyl-4,4'-isopropylidene-(bisphenyl)diphosphite, mono- or diphenyl-mono- or di-$C_8$-$C_{13}$ alkyl phosphite, mono- or diphenyl-mono- or di-($C_8$-$C_{13}$)alkoxyalkyl phosphite, diphenyl isodecyl phosphite, tris(decyl) phosphite, and triphenyl phosphate.

20. The flame retarded foamed plastic composition of claim 1, wherein:
the amount of hindered amine compound (C) is 0.005-0.05 parts per 100 parts of the resin (A);
the amount of blowing agent (D) is between 0.05 and 0.3 moles per 100 g of the resin (A);
the amount of foam nucleus agent (E) is 0.5-2.0 parts by weight per 100 parts by weight of the resin (A); and
the amount of phosphite ester heat stabilizer (F) is up to 0.1 parts by weight per 100 parts by weight of the resin.

21. The flame retarded foamed plastic composition of claim 1, wherein:
the amount of brominated flame retardant (B) is between 1.0-2.5 parts per 100 parts of the resin (A); and
the amount of hindered amine compound (C) is 0.005-0.05 parts per 100 parts of the resin (A).

22. The flame retarded foamed plastic composition of claim 21, wherein:
the amount of brominated flame retardant (B) is between 1.0-2.0 parts per 100 parts of the resin (A).

23. The flame retarded foamed plastic composition of claim 1, wherein said hindered amine is bis(2,2,6,6-tetramethyl-4-piperidinyl) sebacate, bis(1,2,2,6,6-pentamethyl-4-piperidinyl) sebacate, or bis(2,2,6,6-tetramethyl-1-octyloxy-4-piperidinyl) sebacate.

* * * * *